US008471523B2

(12) United States Patent
Lin

(10) Patent No.: US 8,471,523 B2
(45) Date of Patent: Jun. 25, 2013

(54) CHARGING/DISCHARGING DEVICE HAVING CONCEALED UNIVERSAL SERIAL BUS PLUG(S)

(75) Inventor: Wei-Jong Lin, Taipei Hsien (TW)

(73) Assignee: Multi-Function Co., Ltd., Taipei Hsien (TW)

( * ) Notice: Subject to any disclaimer, the term of this patent is extended or adjusted under 35 U.S.C. 154(b) by 399 days.

(21) Appl. No.: 12/902,866

(22) Filed: Oct. 12, 2010

(65) Prior Publication Data

US 2011/0089892 A1 Apr. 21, 2011

(30) Foreign Application Priority Data

Oct. 19, 2009 (TW) ................................ 98219227 U

(51) Int. Cl.
*Y02E 60/12* (2006.01)
(52) U.S. Cl.
USPC ........................................... 320/107; 439/131
(58) Field of Classification Search
USPC ................. 320/107, 110, 111, 112, 113, 114, 320/115; 439/131, 136, 141
See application file for complete search history.

(56) References Cited

U.S. PATENT DOCUMENTS

| | | | | |
|---|---|---|---|---|
| 6,774,603 B2 * | 8/2004 | Liao | ............................... | 320/107 |
| 7,125,265 B2 * | 10/2006 | Weng | ............................. | 439/131 |
| 7,291,041 B1 * | 11/2007 | Yang | .............................. | 439/500 |
| 7,500,858 B2 * | 3/2009 | Emerson et al. | .............. | 439/136 |
| 7,530,823 B1 * | 5/2009 | Thornton et al. | ............. | 439/136 |
| 7,746,029 B2 * | 6/2010 | Toya | .............................. | 320/107 |
| 7,755,323 B2 * | 7/2010 | Wu | ................................ | 320/114 |
| 7,850,468 B2 * | 12/2010 | Ni et al. | ......................... | 439/131 |
| 7,888,909 B2 * | 2/2011 | Larsen et al. | .................. | 320/115 |
| 8,029,303 B2 * | 10/2011 | Chiang | ........................... | 439/172 |
| 2005/0017675 A1 * | 1/2005 | Hsieh et al. | ..................... | 320/107 |
| 2007/0182363 A1 * | 8/2007 | Yang | .............................. | 320/107 |
| 2008/0157712 A1 * | 7/2008 | Garcia | ........................... | 320/101 |
| 2011/0074340 A1 * | 3/2011 | Kao | ............................... | 320/107 |

* cited by examiner

*Primary Examiner* — Drew A Dunn
*Assistant Examiner* — Michael Dibenedetto
(74) *Attorney, Agent, or Firm* — C. G. Mersereau; Nikolai & Mersereau, P.A.

(57) ABSTRACT

A charging/discharging device having at least one concealed universal serial bus (USB) plug has a housing having at least one plug hoe, and at least one retractable plug assembly mounted in the housing. Each of the at least one retractable plug assembly has a slidable second circuit board, a resilient element pushing the second circuit board toward a corresponding one of the plug hole of the housing, a USB plug mounted on the second circuit board and corresponding to the corresponding plug hole of the housing, and a locker mounted through and selectively engaging the second circuit board to prevent the second circuit board from sliding when the USB plug is stored in or protrudes out of the housing. Therefore, since the USB plug is able to be concealed in the housing, the USB plug is not damaged.

19 Claims, 5 Drawing Sheets

CHARGING/DISCHARGING DEVICE HAVING CONCEALED UNIVERSAL SERIAL BUS PLUG(S)

BACKGROUND OF THE INVENTION

1. Field of the Invention

The present invention relates to a charging/discharging device having at least one concealed universal serial bus plug, especially to a charging/discharging device that has at least one battery mounted inside and is able to charge an electronic device with electricity of the at least one battery and to recharge the at least one battery.

2. Description of the Prior Art(s)

An electronic device consumes electricity while operation. The electricity generally comes from a domestic power or a battery. The battery is broadly used in a small or portable electronic device so the small or portable electronic device still works when taken outdoors. Moreover, since rechargeable batteries are reusable and have economic and environmental benefits, more and more electronic devices use the rechargeable batteries as their power source.

However, when a user is going outdoors, finding a mains outlet to recharge the rechargeable batteries is difficult. Therefore, a conventional portable charging/discharging device is designed and has at least one rechargeable battery mounted therein, and a universal serial bus (USB) plug and a USB receptacle mounted thereon. The at least one rechargeable battery of the conventional charging/discharging device is recharged through a USB extension cord connecting the USB receptacle to a power source. Thus, when the user is going outdoors, the conventional charging/discharging device is able to be a temporary power source, and provides electricity to the electronic device or charges the rechargeable battery of the electronic device.

Nevertheless, since the USB plug of the conventional charging/discharging device protrudes outwardly, the USB plug may be collided or jammed by some other things and breaks easily. Although a cap is able to be used to mount around and to protect the USB plug, the cap get lost easily.

Furthermore, since the conventional charging/discharging device has only one USB plug with a specific type, the user should take some different kinds of adapters along in order to charge the electronic devices that have different types of USB receptacles. Taking the adapters along is inconvenient and the adapters also get lost easily.

To overcome the shortcomings, the present invention provides a charging/discharging device having at least one concealed USB plug to mitigate or obviate the aforementioned problems.

SUMMARY OF THE INVENTION

The main objective of the present invention is to provide a charging/discharging device having at least one concealed universal serial bus (USB) plug. The charging/discharging device has a housing having at least one plug hoe, and at least one retractable plug assembly mounted in the housing. Each of the at least one retractable plug assembly has a slidable second circuit board, a resilient element pushing the second circuit board toward a corresponding one of the plug hole of the housing, a USB plug mounted on the second circuit board and corresponding to the corresponding plug hole of the housing, and a locker mounted through and selectively engaging the second circuit board to prevent the second circuit board from sliding when the USB plug is stored in or protrudes out of the housing. Therefore, since the USB plug is able to be concealed in the housing, the USB plug is not damaged.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
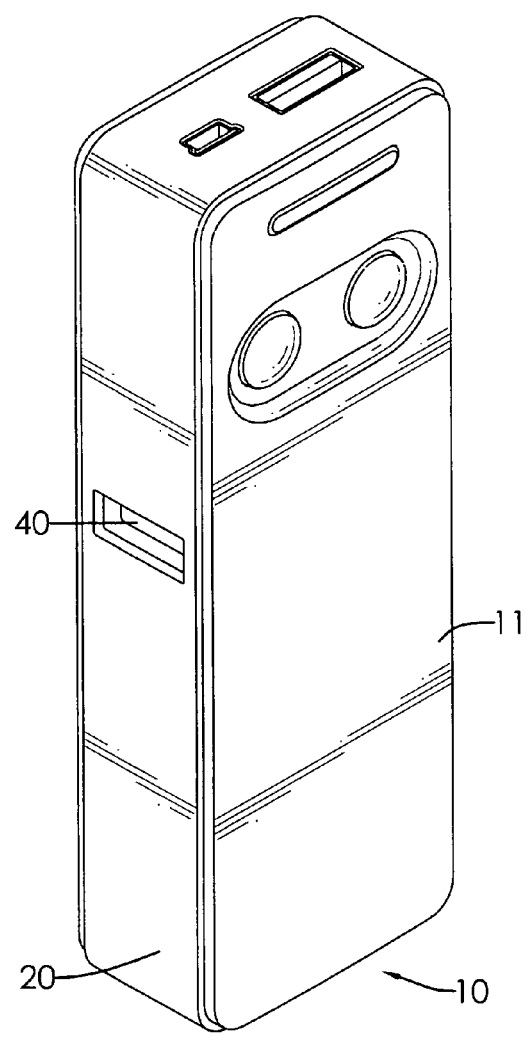
FIG. 1 is a perspective view of a charging/discharging device having at least one concealed universal serial bus plug in accordance with the present invention.
Figure 2:
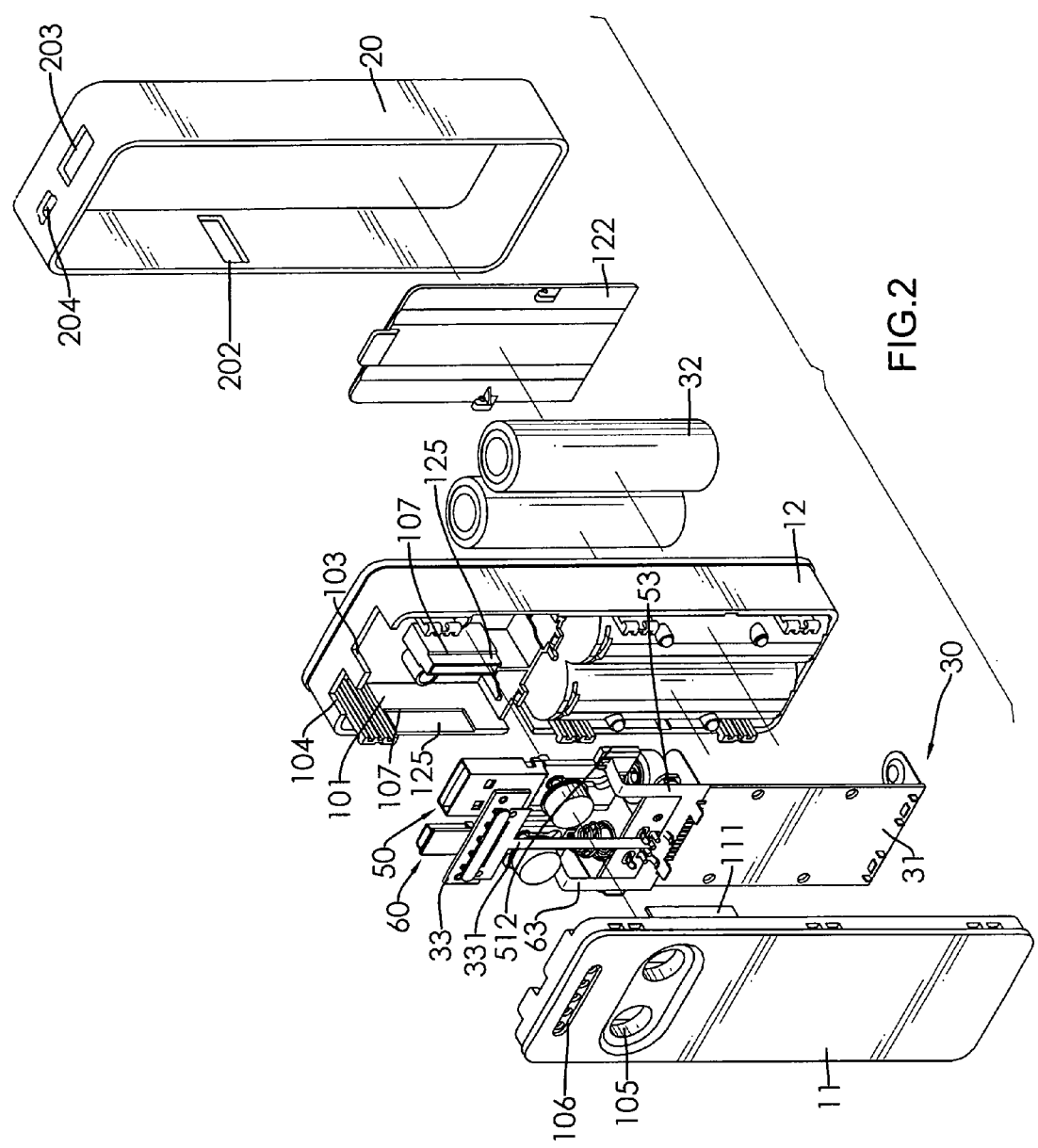
FIG. 2 is an exploded perspective view of the charging/discharging device in FIG. 1.
Figure 3:
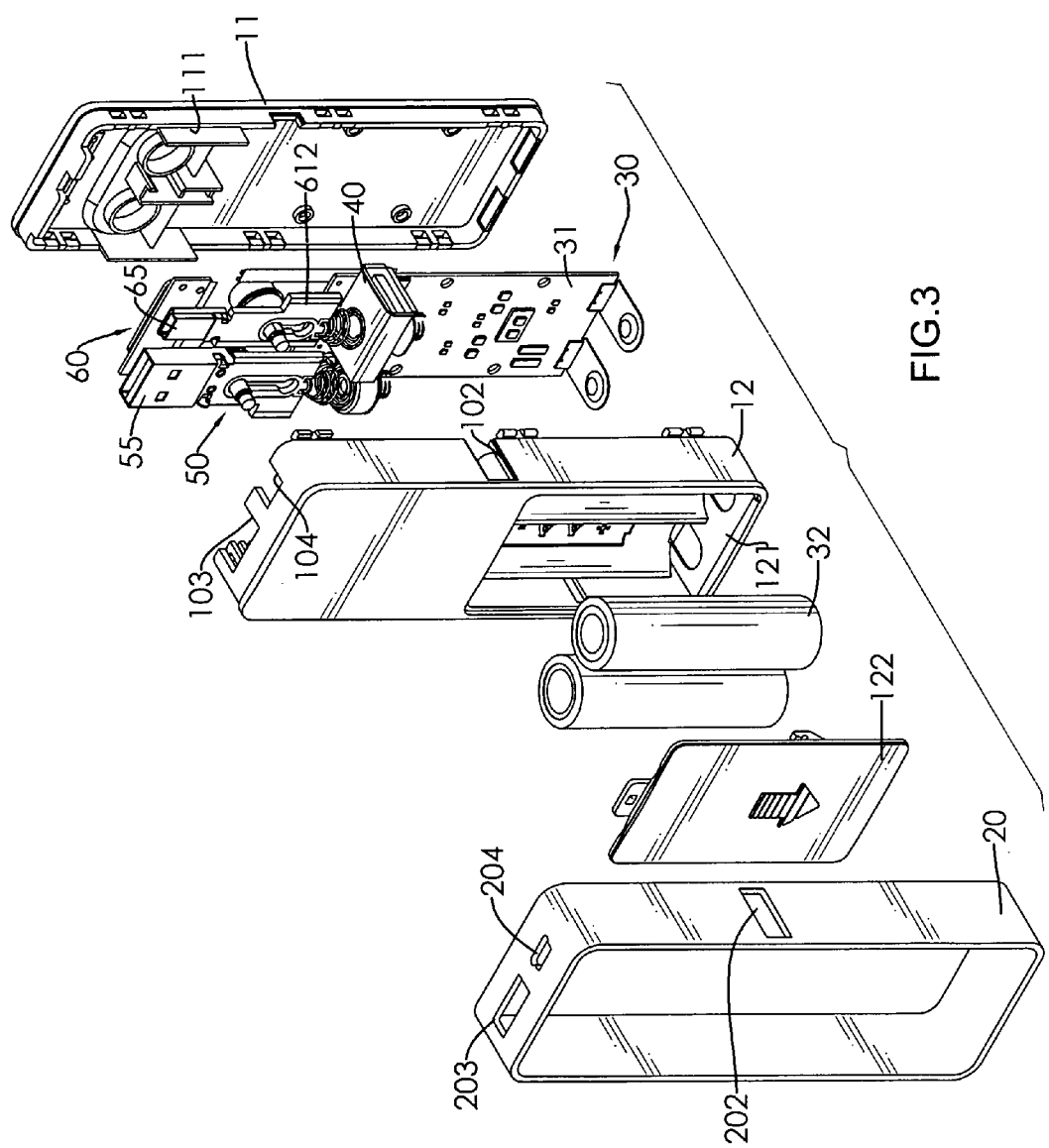
FIG. 3 is another exploded perspective view of the charging/discharging device in FIG. 1.

With reference to FIGS. 1 to 3, a charging/discharging device having at least one USB plug comprises a housing 10, an outer frame 20, a power module 30, at least one universal serial bus (USB) receptacle 40 and at least one retractable plug assembly 50, 60.

The housing 10 comprises a front-half housing 11 and a rear-half housing 12 attached to each other, and has an inner room 101, at least one socket hole 102, at least one plug hole 103, 104, at least one button hole 105, a light hole 106 and at least one guiding recess 107.

The front-half housing 11 has at least one limiting protrusion 111 protruding from an inner bottom adjacent to a peripheral edge of the front-half housing 11.

The rear-half housing 12 has a battery recess 121, a cover 122, at least one sliding tube 123, at least one resilient element 124 and at least one indentation 125. The battery recess 121 is formed in an outer surface of the rear-half housing 12. The cover 122 is mounted on the outer surface of the rear-half housing 12 and covers the battery recess 121 of the rear-half housing 12. The at least one sliding tube 123 is tubular and is formed on an inner bottom of the rear-half housing 12. The at least one resilient element 124 of the rear-half housing 12 is mounted in the at least one sliding tube 123. Each of the at least one resilient element 124 of the rear-half housing 12 may be a compression spring or a spring plate. The at least one indentation 125 is formed in an inner peripheral surface of the rear-half housing 12 and corresponds to the at least one limiting protrusion 111 of the front-half housing 11. When the front-half housing 11 is attached to the rear-half housing 12, the at least one limiting protrusion 111 of the front-half housing 11 is mounted in the at least one indentation 125 of the rear-half housing 12.

The inner room 101 is defined between the front-half housing 11 and the rear-half housing 12. The at least one socket hole 102 is formed through a peripheral wall of the housing 10. The at least one plug hole 103, 104 is formed through the peripheral wall of the housing 10 and communicates with the inner room 101. The at least one button hole 105 is formed through a front surface of the housing 10, is formed through the front-half housing 11 and communicates with the inner room 101. Each of the at least one button hole 105 corresponds to a corresponding one of the at least one sliding tube 123 of the rear-half housing 12. The light hole 106 is formed through the front surface of the housing 10 and is formed through the front-half housing 11 of the housing 10. The at least one guiding recess 107 is formed in an inner peripheral surface of the housing 10 and is defined between the inner peripheral surface of the rear-half housing 12 and the at least one limiting protrusion 111 of the front-half housing 11.

The outer frame 20 is circular, is mounted around the housing 10 and has at least one mounting hole 202 and at least one through hole 203, 204. The at least one mounting hole 202 is formed through the outer frame 20. Each of the at least one mounting hole 202 corresponds to a corresponding one of the at least one socket hole 102 of the housing 10. The at least one through hole 203, 204 is formed through the outer frame 20. Each of the at least one through hole 203, 204 corresponds to a corresponding one of the at least one plug hole 103, 104 of the housing 10.

The power module 30 is mounted in the inner room 101 of the housing 10 and has a first circuit board 31, at least one battery 32, an indication light 33 and a first conductor 331. The first circuit board 31 has a discharging circuit and a charging circuit. The discharging circuit and the charging circuit are formed on the first circuit board 31. The at least one battery 32 is mounted in the battery recess 121 of the rear-half housing 12 and is connected electrically to the discharging and charging circuits of the first circuit board 31. Each of the at least one battery 32 may be a disposable battery or a rechargeable battery. The indication light 33 is mounted in and protrudes out from the light hole 106 of the housing 10. The first conductor 331 may be a flexible printed circuit board or a conducting wire and electrically connects the indication light 33 to the discharging and charging circuits of the first circuit board 31 to allow the indication light 33 to indicate that the at least one battery 32 is under discharging, charging or not.

The at least one USB receptacle 40 may be standard-A type, standard-B type, mini-A type, mini-B type, micro-A type or micro-B type, is mounted in the inner room 101 of the housing 10, corresponds to the at least one socket hole 102 of the housing 10 and is connected electrically to the charging circuit of the first circuit board 31.

Figure 4:
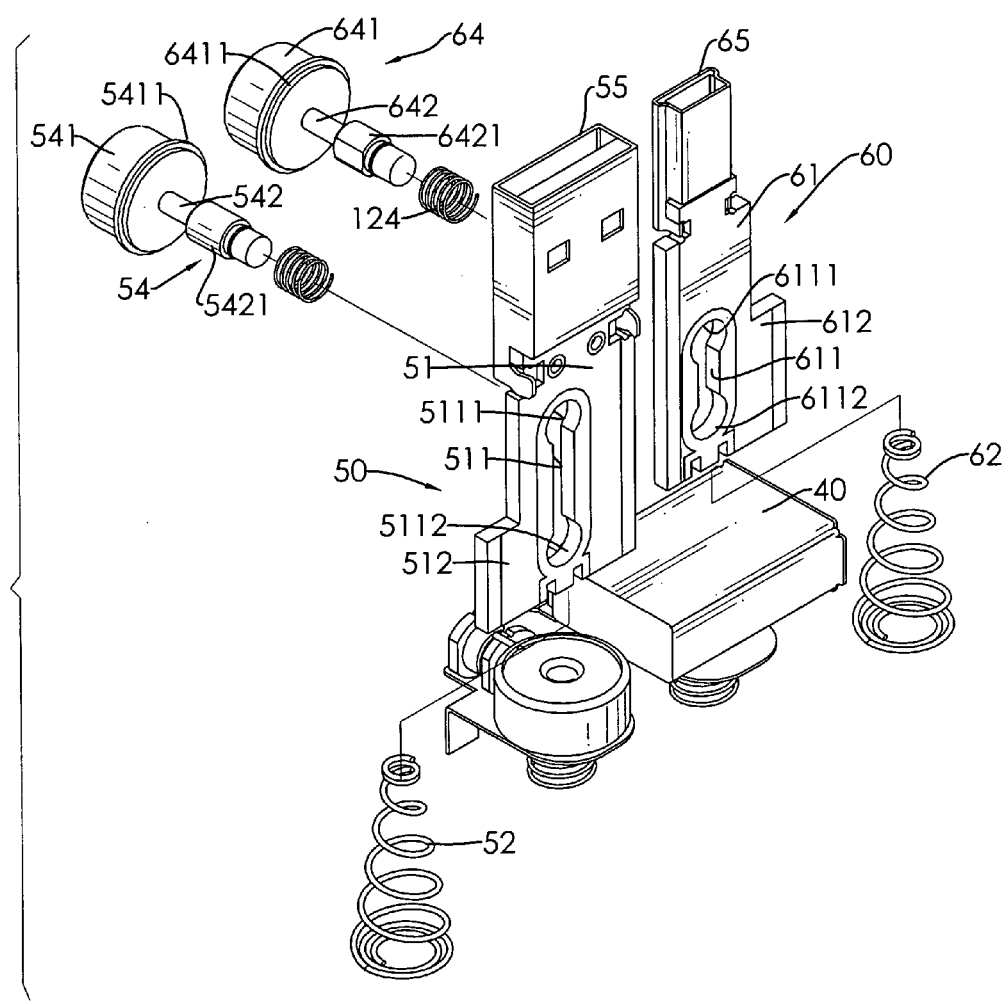
FIG. 4 is an enlarged exploded perspective of the charging/discharging device in FIG. 1.

With further reference to FIG. 4, the at least one retractable plug assembly 50, 60 is mounted in the inner room 101 of the housing 10. Each of the at least one retractable plug assembly 50, 60 has a second circuit board 51, 61, a resilient element 52, 62, a second conductor 53, 63, a locker 54, 64 and a USB plug 55, 65.

The second circuit board 51, 61 is mounted slidably in the inner room 101 of the housing 10 and has a first end, a second end, a sliding slot 511, 611, a first positioning hole 5111, 6111, a second positioning hole 5112, 6112 and a sliding protrusion 512, 612. The first end of the second circuit board 51, 61 corresponds to a corresponding one of the at least one plug hole 103, 104 of the housing 10. The second end of the second circuit board 51, 61 is opposite to the first end of the second circuit board 51, 61. The sliding slot 511, 611 is formed through the second circuit board 51, 61 and extends longitudinally between the first and second ends of the second circuit board 51, 61. The first positioning hole 5111, 6111 is formed through the second circuit board 51, 61, is disposed at an end of the sliding slot 511, 611 and communicates with the sliding slot 511, 611. The second positioning hole 5112, 6112 is formed through the second circuit board 51, 61, is disposed at another end of the sliding slot 511, 611 and communicates with the sliding slot 511, 611. The sliding protrusion 512, 612 protrudes from a side edge of the second circuit board 51, 61 and is mounted slidably in a corresponding one of the at least one guiding recess 107 of the housing 10.

The resilient element 52, 62 of the retractable plug assembly 50, 60 may be a compression spring, is mounted in the inner room 101 of the housing 10 and has two ends respectively abutting the second end of the second circuit board 51, 61 and the housing 10. Thus, the second circuit board 51, 61 is pulled toward the corresponding plug hole 103, 104 of the housing 10.

The second conductor 53, 63 may be a flexible printed circuit board or a conducting wire and electrically connects the second circuit board 51, 61 to the discharging circuit of the first circuit board 31.

The locker 54, 64 is slidably mounted returnable through a corresponding one of the at least one button hole 105 of the housing 10 and has a button 541, 641 and a shaft 542, 642. The button 541, 641 is mounted slidably in the corresponding button hole 105 of the housing 10 and has an inner end and a flange 5411, 6411. The inner end of the button 541, 641 corresponds to the inner room 101 of the housing 10. The flange 5411, 6411 is formed around the button 541, 641 and abutting the inner bottom of the front-half housing 11. The shaft 542, 642 protrudes from the inner end of the button 541, 641, is mounted slidably through the sliding slot 511, 611 of the second circuit board 51, 61 and has a distal end and a locking protrusion 5421, 6421. The distal end of the shaft 542, 642 slidably protrudes into a corresponding one of the at least one sliding tube 123 of the rear-half housing 12. The locking protrusion 5421, 6421 is formed around the shaft 542, 642, slidably protrudes into the corresponding sliding tube 123 of the rear-half housing 12, abuts a corresponding one of the at least one resilient element 124 of the rear-half housing 12 and selectively engages one of the first and second positioning holes 5111, 6111, 5112, 6112 of the second circuit board 51, 61.

The USB plug 55, 65 may be standard-A type, standard-B type, mini-A type, mini-B type, micro-A type or micro-B type, is mounted securely on the first end of the second circuit board 51, 61, is connected electrically to the second circuit board 51, 61, and corresponds to and selectively protrudes through a corresponding one of the at least one plug hole 103, 104 of the housing 10.

Figure 5:
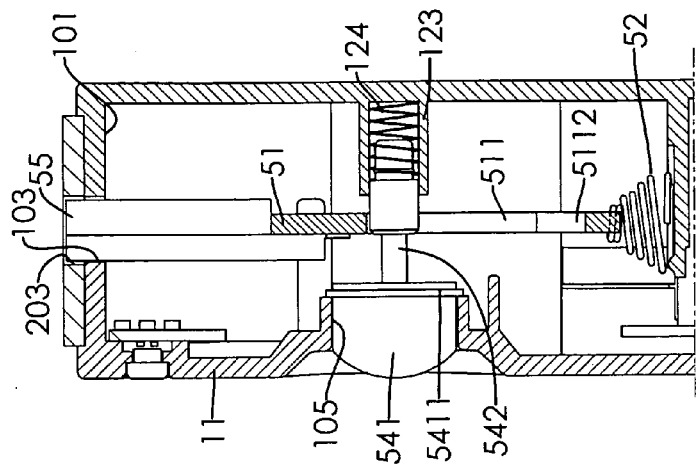
FIGS. 5 to 7 are operational side views in partial section of the charging/discharging device in FIG. 1.

With reference to FIG. 5, when the USB plug 55, 65 is stored in the housing 10, the locking protrusion 5421, 6421 of the shaft 542, 642 of the locker 54, 64 engages the first positioning hole 5111, 6111 of the second circuit board 51, 61.

Figure 6:
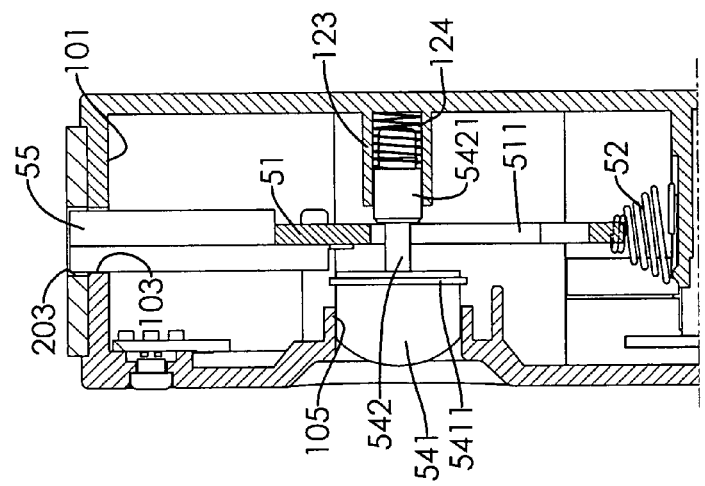

With further reference to FIG. 6, as the button 541, 641 of the locker 54, 64 is pushed, the locking protrusion 5421, 6421 moves into the corresponding sliding tube 123 of the rear-half housing 12, disengages from the second circuit board 51, 61 and presses the resilient element 124 of the rear-half housing 12. Meanwhile, the resilient element 52, 62 of the at least one retractable plug assembly 50, 60 pushes the second circuit board 51, 61 and the USB plug 55, 65.

Figure 7:
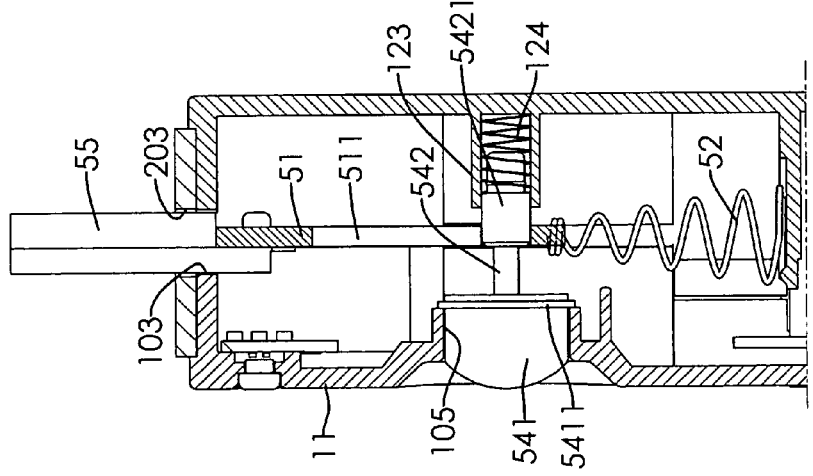

Thus, with further reference to FIG. 7, the second circuit board 51, 61 moves toward outside of the housing 10 and the USB plug 55, 65 protrudes out of the housing 10. When the shaft 542, 642 of the locker 54, 64 is disposed in the second positioning hole 5112, 6112 of the second circuit board 51, 61, the second circuit board 51, 61 stops moving. Then, releasing the button 541, 641 of the locker 54, 64, the resilient element 124 of the rear-half housing 12 pushes the locker 54, 64 back so the locking protrusion 5421, 6421 of the locker 54, 64 engages the second positioning hole 5112, 6112 of the second circuit board 51, 62. Since the flange 5411, 6411 of the locker 54, 64 abuts the front-half housing 11, the locker 54, 64 does not drop out of the housing 10.

Therefore, the USB plug 55, 65 that protrudes out of the housing 10 is able to be plugged in a corresponding receptacle of an electronic device, and then the electricity of the at least one battery 32 is discharged through the discharging circuit of the first circuit board 31 and charges the electronic device. Moreover, if the at least one battery 32 is rechargeable, when the electricity of the at least one battery 32 is used up, the at least one battery 32 is able to be recharged through a USB extension cord by a power source.

The charging/discharging device having the at least one concealed USB plug 55, 65 as described has the following advantages. Since the USB plug 55, 65 is slidable to protrude out of or to conceal in the housing 10, the USB plug 55, 65 is not collided or jammed and a cap for protecting the USB plug 55, 65 is saved. Moreover, when the charging/discharging device has multiple retractable plug assemblies 50, 60 with different types of USB plugs 55, 65, the charging/discharging device is suitable for the electronic devices that have different types of USB receptacles.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A charging/discharging device comprising
   a housing comprising a front-half housing and a rear-half housing attached to each other, and having
      an inner room defined between the front-half housing and the rear-half housing;
      at least one plug hole formed through a peripheral wall of the housing and communicating with the inner room; and
      at least one button hole formed through the front-half housing and communicating with the inner room;
   a power module mounted in the inner room of the housing and having
      a first circuit board having a discharging circuit formed on the first circuit board; and
      at least one battery connected electrically to the discharging circuit of the first circuit board; and
   at least one retractable plug assembly mounted in the inner room of the housing, and each of the at least one retractable plug assembly having
      a second circuit board mounted slidably in the inner room of the housing and having
         a first end corresponding to a corresponding one of the at least one plug hole of the housing;
         a second end being opposite to the first end of the second circuit board;
         a sliding slot formed through the second circuit board and extending longitudinally between the first and second ends of the second circuit board;
         a first positioning hole formed through the second circuit board, disposed at an end of the sliding slot and communicating with the sliding slot; and
         a second positioning hole formed through the second circuit board, disposed at another end of the sliding slot and communicating with the sliding slot;
      a resilient element mounted in the inner room of the housing and having two ends respectively abutting the second end of the second circuit board and the housing;
      a second conductor electrically connecting the second circuit board to the discharging circuit of the first circuit board;
      a locker slidably mounted returnably through a corresponding one of the at least one button hole of the housing and having
         a button mounted slidably in the corresponding button hole of the housing and having an inner end corresponding to the inner room of the housing; and
         a shaft protruding from the inner end of the button, mounted slidably through the sliding slot of the second circuit board and having a locking protrusion formed around the shaft and selectively engaging one of the first and second positioning holes of the second circuit board; and
      a universal serial bus (USB) plug mounted securely on the first end of the second circuit board, connected electrically to the second circuit board, and corresponding to and selectively protruding through a corresponding one of the at least one plug hole of the housing.

2. The charging/discharging device as claimed in claim 1, wherein
   the housing further has at least one socket hole formed through the peripheral wall of the housing;
   the first circuit board of the power module further has a charging circuit formed on the first circuit board and connected electrically to the at least one battery of the power module; and
   the charging/discharging device further has at least one USB receptacle mounted in the inner room 101 of the housing 10, corresponding to the at least one socket hole of the housing and connected electrically to the charging circuit of the first circuit board.

3. The charging/discharging device as claimed in claim 2, wherein
   the housing further has a light hole formed through the front-half housing of the housing; and
   the power module further has
      an indication light mounted in and protruding out from the light hole of the housing; and
      a first conductor electrically connecting the indication light to the discharging and charging circuits of the first circuit board.

4. The charging/discharging device as claimed in claim 2 further having an outer frame being circular, mounted around the housing and having
   at least one mounting hole formed through the outer frame, and each of the at least one mounting hole corresponding to a corresponding one of the at least one socket hole of the housing; and
   at least one through hole formed through the outer frame, and each of the at least one through hole corresponding to a corresponding one of the at least one plug hole of the housing.

5. The charging/discharging device as claimed in claim 2, wherein the at least one USB receptacle and the USB plug of each of the at least one retractable are standard-A type, standard-B type, mini-A type, mini-B type, micro-A type or micro-B type.

6. The charging/discharging device as claimed in claim 3, wherein the at least one USB receptacle and the USB plug of each of the at least one retractable are standard-A type, standard-B type, mini-A type, mini-B type, micro-A type or micro-B type.

7. The charging/discharging device as claimed in claim 4, wherein the at least one USB receptacle and the USB plug of each of the at least one retractable are standard-A type, standard-B type, mini-A type, mini-B type, micro-A type or micro-B type.

8. The charging/discharging device as claimed in claim 5, wherein
the rear-half housing has
at least one sliding tube being tubular, formed on an inner bottom of the rear-half housing, and each of the at least one sliding tube corresponding to a corresponding one of the at least one button hole of the housing; and
at least one resilient element mounted in the at least one sliding tube;
the button of the locker of each of the at least one retractable plug assembly further has a flange formed around the button and abutting an inner bottom of the front-half housing;
the shaft of the locker of each of the at least one retractable plug assembly further has a distal end slidably protruding into a corresponding one of the at least one sliding tube of the rear-half housing; and
the locking protrusion of the locker of each of the at least one retractable plug assembly slidably protruding into the corresponding sliding tube of the rear-half housing and abutting a corresponding one of the at least one resilient element of the rear-half housing.

9. The charging/discharging device as claimed in claim 6, wherein
the rear-half housing has
at least one sliding tube being tubular, formed on an inner bottom of the rear-half housing, and each of the at least one sliding tube corresponding to a corresponding one of the at least one button hole of the housing; and
at least one resilient element mounted in the at least one sliding tube;
the button of the locker of each of the at least one retractable plug assembly further has a flange formed around the button and abutting an inner bottom of the front-half housing;
the shaft of the locker of each of the at least one retractable plug assembly further has a distal end slidably protruding into a corresponding one of the at least one sliding tube of the rear-half housing; and
the locking protrusion of the locker of each of the at least one retractable plug assembly slidably protruding into the corresponding sliding tube of the rear-half housing and abutting a corresponding one of the at least one resilient element of the rear-half housing.

10. The charging/discharging device as claimed in claim 7, wherein
the rear-half housing has
at least one sliding tube being tubular, formed on an inner bottom of the rear-half housing, and each of the at least one sliding tube corresponding to a corresponding one of the at least one button hole of the housing; and
at least one resilient element mounted in the at least one sliding tube;

the button of the locker of each of the at least one retractable plug assembly further has a flange formed around the button and abutting an inner bottom of the front-half housing;
the shaft of the locker of each of the at least one retractable plug assembly further has a distal end slidably protruding into a corresponding one of the at least one sliding tube of the rear-half housing; and
the locking protrusion of the locker of each of the at least one retractable plug assembly slidably protruding into the corresponding sliding tube of the rear-half housing and abutting a corresponding one of the at least one resilient element of the rear-half housing.

11. The charging/discharging device as claimed in claim 8, wherein
the rear-half housing further has at least one indentation formed in an inner peripheral surface of the rear-half housing;
the front-half housing has at least one limiting protrusion protruding from the inner bottom adjacent to a peripheral edge of the front-half housing and corresponding to and mounted in the at least one indentation of the rear-half housing;
the housing further has at least one guiding recess defined between the inner peripheral surface of the rear-half housing and the at least one limiting protrusion of the front-half housing; and
the second circuit board of each of the at least one retractable plug assembly further has a sliding protrusion protruding from a side edge of the second circuit board and mounted slidably in a corresponding one of the at least one guiding recess of the housing.

12. The charging/discharging device as claimed in claim 9, wherein
the rear-half housing further has at least one indentation formed in an inner peripheral surface of the rear-half housing;
the front-half housing has at least one limiting protrusion protruding from the inner bottom adjacent to a peripheral edge of the front-half housing and corresponding to and mounted in the at least one indentation of the rear-half housing;
the housing further has at least one guiding recess defined between the inner peripheral surface of the rear-half housing and the at least one limiting protrusion of the front-half housing; and
the second circuit board of each of the at least one retractable plug assembly further has a sliding protrusion protruding from a side edge of the second circuit board and mounted slidably in a corresponding one of the at least one guiding recess of the housing.

13. The charging/discharging device as claimed in claim 10, wherein
the rear-half housing further has at least one indentation formed in an inner peripheral surface of the rear-half housing;
the front-half housing has at least one limiting protrusion protruding from the inner bottom adjacent to a peripheral edge of the front-half housing and corresponding to and mounted in the at least one indentation of the rear-half housing;
the housing further has at least one guiding recess defined between the inner peripheral surface of the rear-half housing and the at least one limiting protrusion of the front-half housing; and
the second circuit board of each of the at least one retractable plug assembly further has a sliding protrusion protruding from a side edge of the second circuit board and mounted slidably in a corresponding one of the at least one guiding recess of the housing.

14. The charging/discharging device as claimed in claim 8, wherein
- the resilient element of the retractable plug assembly is a compression spring; and
- each of the at least one resilient element of the rear-half housing is a compression spring or a spring plate.

15. The charging/discharging device as claimed in claim 9, wherein
- the resilient element of the retractable plug assembly is a compression spring; and
- each of the at least one resilient element of the rear-half housing is a compression spring or a spring plate.

16. The charging/discharging device as claimed in claim 10, wherein
- the resilient element of the retractable plug assembly is a compression spring; and
- each of the at least one resilient element of the rear-half housing is a compression spring or a spring plate.

17. The charging/discharging device as claimed in claim 8, wherein
- the rear-half housing further has
  - a battery recess formed in an outer surface of the rear-half housing; and
  - a cover mounted on the outer surface of the rear-half housing and covering the battery recess of the rear-half housing; and
- the at least one battery of the power module is mounted in the battery recess of the rear-half housing.

18. The charging/discharging device as claimed in claim 9, wherein
- the rear-half housing further has
  - a battery recess formed in an outer surface of the rear-half housing; and
  - a cover mounted on the outer surface of the rear-half housing and covering the battery recess of the rear-half housing; and
- the at least one battery of the power module is mounted in the battery recess of the rear-half housing.

19. The charging/discharging device as claimed in claim 10, wherein
- the rear-half housing further has
  - a battery recess formed in an outer surface of the rear-half housing; and
  - a cover mounted on the outer surface of the rear-half housing and covering the battery recess of the rear-half housing; and
- the at least one battery of the power module is mounted in the battery recess of the rear-half housing.

\* \* \* \* \*